(12) United States Patent
Ingold et al.

(10) Patent No.: US 11,668,271 B1
(45) Date of Patent: Jun. 6, 2023

(54) MECHANICALLY ACTUATED FUEL INJECTOR SYSTEM, METHOD, AND ASSEMBLY HAVING HELPER SPRING

(71) Applicant: Caterpillar Inc., Peoria, IL (US)

(72) Inventors: Abram M. Ingold, Metamora, IL (US); Vasudev Koppram, Chennai (IN); Xuefeng Song, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/723,492

(22) Filed: Apr. 19, 2022

(51) Int. Cl.
*F02M 63/00* (2006.01)
*F16K 31/524* (2006.01)

(52) U.S. Cl.
CPC .............. *F02M 63/0014* (2013.01); *F16K 31/52408* (2013.01)

(58) Field of Classification Search
CPC ............... F02M 63/0014; F16K 31/52408
USPC ................................................ 123/507, 508
See application file for complete search history.

(56) References Cited

U.S. PATENT DOCUMENTS

| | | | |
|---|---|---|---|
| 2,743,712 A | 5/1956 | Hulsing | |
| 2,927,566 A | 3/1960 | Moye | |
| 5,394,843 A | 3/1995 | Decuir | |
| 5,546,899 A | 8/1996 | Sperling et al. | |
| 5,673,661 A * | 10/1997 | Jesel | F01L 1/14 123/90.48 |
| 5,983,849 A * | 11/1999 | Wangen | F01L 1/14 123/193.3 |
| 7,210,439 B2 | 5/2007 | Geyer et al. | |
| 7,546,823 B2 | 6/2009 | Buelna | |
| 10,077,686 B2 | 9/2018 | Baltrucki et al. | |
| 10,570,863 B1 | 2/2020 | Robel et al. | |
| 2011/0265456 A1 | 11/2011 | Fiveland et al. | |
| 2017/0089223 A1 | 3/2017 | Kizhakkethara et al. | |

* cited by examiner

*Primary Examiner* — Hai H Huynh
(74) *Attorney, Agent, or Firm* — Xsensus, LLP (57) ABSTRACT

Fuel injector systems, methods, and assemblies can comprise an injector pushrod; a hold down clamp having an opening that can slidably receive the injector pushrod; a helper spring that can surround a first portion of the injector pushrod; a spacer that can surround a second portion of the injector pushrod and that can be positioned between the hold down clamp and a first end of the helper spring; and a retention seat that can retain a second end of the helper spring opposite the first end of the helper spring and that can surround a third portion of the injector pushrod.

20 Claims, 5 Drawing Sheets

MECHANICALLY ACTUATED FUEL INJECTOR SYSTEM, METHOD, AND ASSEMBLY HAVING HELPER SPRING

TECHNICAL FIELD

The present disclosure relates to fuel injectors, particularly mechanically actuated fuel injector systems, methods, and assemblies that implement a helper spring.

BACKGROUND

Generally, components of an injector train of a mechanically actuated unit injector may separate due to high dynamic excitation. The separation of the injector drive train and subsequent reconnection can result in high loading and contact pressure between the mating components. This phenomenon can lead to camshaft spalling, tappet spring fatigue, injector failure, and/or accelerated wear of contact points, among other problems.

U.S. Pat. No. 5,394,843 ("the '843 patent") describes a valve control device. The '843 patent describes a pushrod that connects at opposite ends to a valve engagement assembly and a valve lifter, respectively, extending through a through hole in a cylinder head, a seating plate, a pushrod spring, and a spring stop. Opposite ends of the pushrod spring are provided against the seating plate and the spring stop, respectively. According to the '843 patent, particularly in the context of a valve, the predetermined strength and mass of the rocker arm is a function of the combination of the strength of the valve and pushrod spring, as well as the valve spring of the valve stem and the valve guide.

SUMMARY

According to an aspect of the present disclosure, an injector drivetrain assembly is disclosed or implemented. The injector drivetrain assembly can comprise: an injector pushrod; a hold down clamp having an opening that slidably receives the injector pushrod; a helper spring in the form of a coil spring that surrounds a first portion of the injector pushrod; a hollow spacer in the form of a collar that surrounds a second portion of the injector pushrod and that is positioned to abut the hold down clamp and a first end of the helper spring; and an annular retention seat that retains a second end of the helper spring opposite the first end of the helper spring and that surrounds a third portion of the injector pushrod.

According to another aspect of the present disclosure, a method regarding an injector drivetrain assembly for a diesel engine is disclosed or implemented. The method can comprise: providing an injector pushrod of the injector drivetrain assembly; providing a clamp of the injector drivetrain assembly, the clamp having a first circular opening sized to slidably receive the injector pushrod; providing a coil spring, the coil spring being sized to surround a first portion of the injector pushrod; providing a spacer, the spacer being hollow and cylindrical, the spacer being sized to surround a second portion the injector pushrod different from the first portion, and the spacer being configured to directly contact the hold down clamp and a first end of the coil spring; and providing a retention seat to receive and retain a second end of the coil spring opposite the first end of the coil spring, the retention seat including a second circular opening extending therethrough to slidably receive the injector pushrod.

According to yet another aspect of the present disclosure, a mechanically actuated fuel injector system is disclosed or implemented. The mechanically actuated fuel injector system can comprise: an upper support; a set of arms supported by the upper support and individually rotatable around a shaft, the set of arms including an injector arm between a first rocker arm and a second rocker arm; a lower support spaced from the upper support; a set of pushrods respectively operatively coupled to the set of arms, the set of pushrods including an injector pushrod between a first valve pushrod and a second valve pushrod; a set of cam followers respectively operatively coupled to the set of pushrods, the set of cam followers including an injector cam follower between a first cam follower associated with the first valve pushrod and a second cam follower associated with the second valve pushrod; a hold down clamp extending from the upper support, the hold down clamp having an opening extending therethrough, the injector pushrod extending through the opening; a helper spring around the injector pushrod, between the hold down clamp and the lower support; a retention seat circumscribing the injector pushrod, a lower end of the helper spring being seated in the retention seat; and a spacer between the hold down clamp and the helper spring, an upper end of the helper spring abutting a lower end of the spacer, and an upper end of the spacer abutting a lower surface of the hold down clamp.

DETAILED DESCRIPTION

The present disclosure relates to fuel injectors, particularly mechanically actuated fuel injector systems, methods, and assemblies that implement a helper spring.

Generally, diesel engines can be classified as one of multiple common types, for example, a common rail engine, a HEUI (Hydraulically operated Electronically actuated Unit Injector) engine, a MUI (Mechanically operated Unit Injector) engine, or a MEUI (Mechanically operated Electronically actuated Unit Injector). These engines can be classified based on the type of fuel injector and fuel system used in the engine. Due to differences between these types of engines, the space inside each cylinder head and actuation requirements may be different for each engine. Accordingly, each of these types of engines may have a unique actuation (including injection) system.

Figure 1:
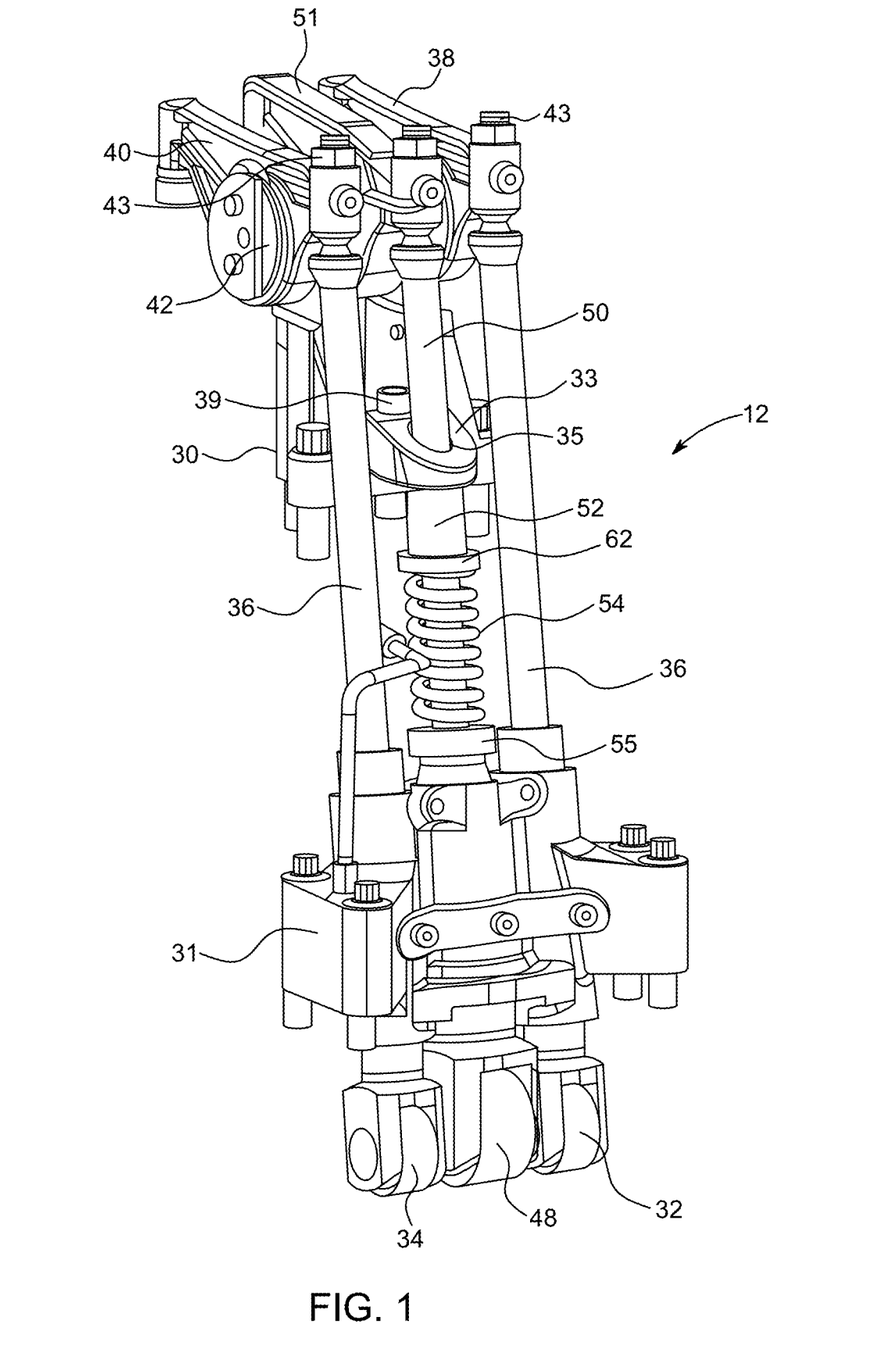
FIG. 1 is a perspective view of an actuation system according to one or more embodiments of the disclosed subject matter.

FIG. 1 illustrates an actuation system 12 according to one or more embodiments of the disclosed subject matter. The actuation system 12 may be implemented in the context of an internal combustion engine, for instance, a four-stroke diesel engine, though embodiments of the disclosed subject matter are not so limited. As will be described in more detail below, the actuation system 12 may help regulate flows of different fluids (e.g., air, fuel, etc.) through the engine.

Actuation system 12 may include or be operatively coupled to elements that move intake and exhaust valves of the engine against the biases of springs from their first positions toward their second positions at desired timings. These elements of the actuation system 12 may include, among other components, a plurality of cam followers (e.g., an intake follower 32 and an exhaust follower 34) configured to ride along a common camshaft of the engine, a pushrod 36 engaged with each cam follower, and a rocker arm (e.g., an intake arm 38 and an exhaust arm 40) configured to translate cam follower motion to the corresponding gas exchange valves. Each rocker arm may be mounted to a base via a shaft 42 and connected to the corresponding valves by way of a bridge (e.g., an intake bridge and an exhaust bridge).

The camshaft of the engine may operatively engage the crankshaft such that a rotation of the crankshaft results in a corresponding rotation of the camshaft. At least one cam lobe may be formed on the camshaft and configured to drive a reciprocating motion of each of the associated cam followers as the camshaft rotates. With this configuration, an outer profile of any intake and exhaust cam lobes may determine, at least in part, the lift timing and profile of the intake and exhaust valves respectively. Similarly, an outer profile of any injector cam lobe(s) may determine, at least in part, an injection timing and profile of an associated fuel injector that can be co-located inside the base and cylinder head.

An end of each of the pushrods 36 may reside inside one of the cam followers 32, 34 and move in accordance with the profile of the cam lobes as the camshaft rotates, thereby transferring a corresponding reciprocating motion to a first pivoting end of an associated rocker arm 38, 40. This reciprocating motion imparted to the rocker arms 38, 40 may cause the rocker arms 38, 40 to pivot or rotate about shaft 42, thereby creating a corresponding reciprocating motion at an opposing second end that lifts and releases intake and exhaust valves, respectively. Thus, the rotation of the camshaft may cause intake and exhaust valves to move from the first position to the second position to create a specific lift pattern corresponding to the profile of the cam lobes. The pushrod 36 associated with the exhaust arm 40 and the pushrod 36 associated with the intake arm 38 may be free of or without any springs provided therearound.

Actuation system 12 can also include an injector follower 48 located between the intake and exhaust followers 32, 34. The injector follower 48, along with the intake follower 32 and the exhaust follower 34, can be referred to as a set of cam followers. The exhaust follower 34 may be referred to or characterized as a first cam follower, and the intake follower 32 may be referred to or characterized herein as a second cam follower.

Figure 2:
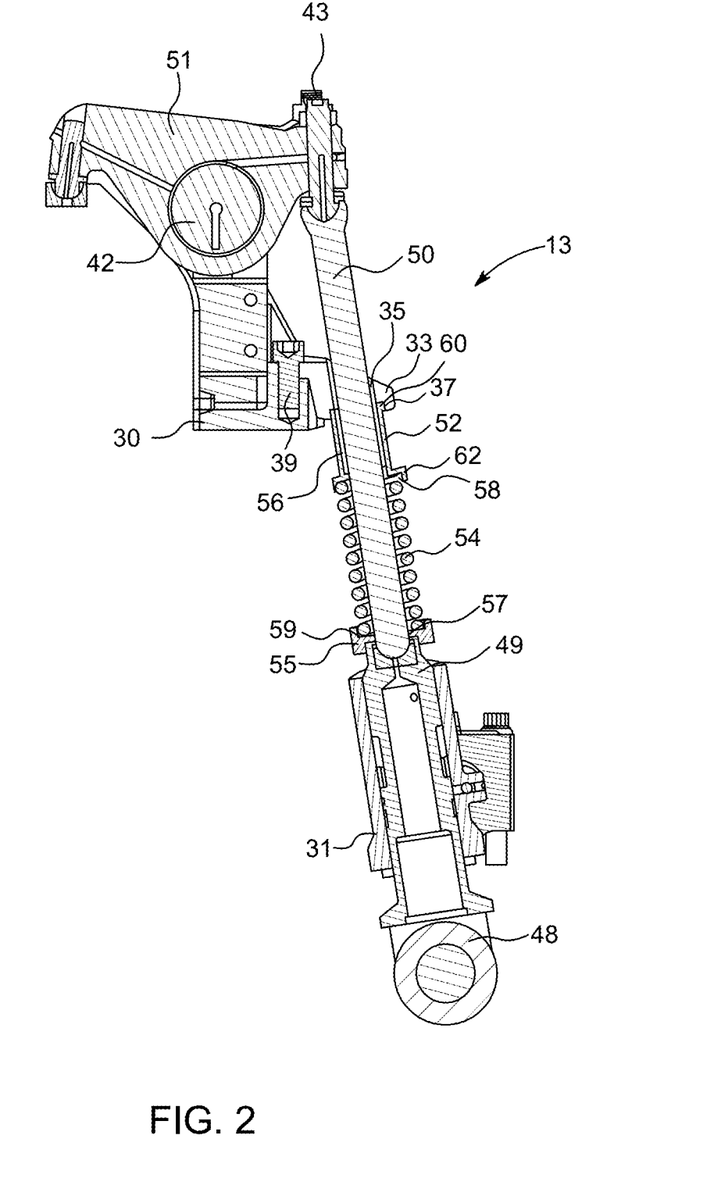
FIG. 2 is a sectional view of an injector assembly of the injector actuation system of FIG. 1, according to one or more embodiments of the disclosed subject matter.

Referring now to FIG. 1 and FIG. 2, the injector follower 48 may be configured to ride along the common camshaft of engine, and a pushrod 50 may connect the injector follower 48 to an injector arm 51 that is pivotally or rotationally mounted to shaft 42 at a location between intake and exhaust arms 38, 40. A first or upper end of the pushrod 50 may be swivel-coupled, i.e., the end is able to swivel, to the injector arm 51. The pushrod 50 may be referred to or characterized as an injector pushrod. The injector arm 51, along with the intake arm 38 and the exhaust arm 40, may be referred to as a set of arms or a set of rocker arms. The pushrod 50, along with the pushrods 36 respectively operatively coupled to the intake arm 38 and the exhaust arm 40, may be referred to as a set of pushrods. Thus, the actuation system 12, or portions thereof, may be referred to or characterized as a mechanically actuated fuel injector system or assembly. Incidentally, an injector train, according to embodiments of the disclosed subject matter, can include the camshaft, an injector lifter 49 (FIG. 2), the pushrod 50, and the injector arm 51.

The actuation system 12 can include an upper support 30 and a lower support 31. As shown in FIG. 1 and FIG. 2, the upper support 30 and the lower support 31 can be spaced from each other, for instance, at least in a vertical direction. The upper support 30 can be the base discussed above or part of the base discussed above. At least between the lower support 31 and each of the intake arm 38 and the exhaust arm 40, the respective pushrods 36 may be free of or without any springs.

A clamp 33 can extend from the upper support 30. The clamp 33 can be removably coupled to the upper support 30 via one or more fasteners 39, for instance, one or more bolts. The clamp 33 can have an opening 35 extending through a body thereof, from a top or first side to a bottom or second side. The opening 35 may be sized to slidably receive the pushrod 50.

According to one or more embodiments, the clamp 33 may be considered a different part from the upper support 30 and thus may not be considered part of the upper support 30. As such, as shown in FIG. 1 and FIG. 2, for instance, the pushrod 50 can extend from the injector arm 51 to the injector lifter 49 at the lower support 31 without extending through the upper support 30. Optionally, the injector lifter 49 may not be considered part of the lower support 31. Thus, the pushrod 50 additionally may not extend into or through the lower support 31, such as shown in FIG. 2.

According to one or more embodiments, the opening 35 through the clamp 33 may be circular, i.e., have a circular circumference in a top or bottom view (e.g., top or bottom sectional view), with an inner diameter greater than a maximum outer diameter of the pushrod 50. Optionally, the diameter of the opening 35 may be uniform from the top side to the bottom side of the body of the clamp 33.

As shown in FIG. 1 and FIG. 2, the lower support 31 can receive the set of pushrods, including the pushrod 50. Also shown in FIG. 2, the injector follower 48 can include or be operatively coupled to the injector lifter 49. The injector lifter 49 can extend through a bore extending through the lower support 31. Incidentally, each of the intake follower 32 and the exhaust follower 34 can have respective lifters, i.e., valve lifters, that extend through respective bores of the lower support 31. The injector lifter 49 can move, based on movement of the corresponding cam lobe, longitudinally within the bore of the lower support 31. In that an upper portion of the injector lifter 49 can receive and retain a lower end of the pushrod 50, the pushrod 50 can move in correspondence with movement of the injector lifter 49. In this regard, the pushrod 50 may be held against the upper portion of the injector lifter 49, i.e., "coupled," by pressure.

The portion of the actuation system 12 associated with fuel injection can be referred to or characterized as an injector assembly 13. The injector assembly 13 may also be referred to or characterized as an injector drivetrain assembly. The injector assembly 13 can be comprised of the pushrod 50, a spring 54, a spacer 52, and a retention seat 55. Optionally, the injector assembly 13 can consist of the pushrod 50, the spring 54, the spacer 52, and the retention seat 55. According to one or more embodiments, the injector assembly 13 can also include the clamp 33. Optionally, the injector assembly 13 can consist of the pushrod 50, the spring 54, the spacer 52, the retention seat 55, and the clamp 33. The spring 54 can be a coil spring, made of metal (e.g., steel), for instance.

The spring 54, the spacer 52, and the retention seat 55, can surround or circumscribe respective portions of the pushrod 50, such as shown in FIG. 2. Such surrounded portions of the pushrod 50 may be referred to as a first portion, a second portion, and a third portion of the pushrod 50, respectively. At least the second portion associated with the spacer 52 and the third portion associated with the retention seat 55 may not overlap each other (e.g., in a side sectional view, etc.). Optionally, the first portion associated with the spring 54 may, in the side sectional view, overlap, at least partially, the second portion associated with the spacer 52 (i.e., at the top of the spring 54 and the bottom of the spacer 52). Optionally, the third portion associated with the retention seat 55 may, in the side sectional view, overlap, at least partially, the first portion associated with the spring 54 (i.e., the bottom of the spring 54 and the top of the retention seat 55). According to one or more embodiments, a portion of the retention seat 55 can surround or circumscribe a bottom end portion of the spring 54, such as shown in FIG. 2.

Generally, the retention seat 55, the spring 54, and the spacer 52 can be between the clamp 33 and the lower support 31. And the spring 54 and the spacer 52 can be between the retention seat 55 and the clamp 31, with the spacer 52 between the spring 54 and the clamp 33. In that the clamp 33 can hold down the spacer 52 and the spring 54 against the retention seat 55, the clamp 33 may be referred to or characterized as a hold down clamp.

A first or upper end of the spring 54 may interface with the spacer 52, and a second or lower end of the spring 54 may interface with the retention seat 55. In that the spring 54 can be provided around the pushrod 50, an inner diameter of the spring 54 can be greater than a maximum outer diameter of the pushrod 50 at least at this location. Thus, according to one or more embodiments, the spring 54 can be sized such that the spring 54 can be slid over at least one of the ends of the pushrod 50 into position along the length of the pushrod 50, such as at the position shown in FIG. 2. In general, the spring 54 can react to the injector lifter 49, against the clamp 33, while constrained by the pushrod 50. According to one or more embodiments, the spring 54 may be referred to or characterized as a helper spring.

The retention seat 55 can be fitted to the injector lifter 49, that is, to an upper portion of the injector lifter 49. The retention seat 55 may be snap-fitted or threadedly connected to the upper portion of the injector lifter 49. According to one or more embodiments, at least a portion of the retention seat 55 can surround or circumscribe at least a portion of the upper portion of the injector lifter 49, such as shown in FIG. 2.

The retention seat 55 can be annular, with an opening 57. The opening 57 can be at a radial center of the retention seat 55. As noted above, the retention seat 55 can surround or circumscribe a portion of the pushrod 50 (third portion of pushrod 50). Thus, the pushrod 50 can at least extend into the opening 57 of the retention seat 55. Optionally, the pushrod 50 may extend through the retention seat 55 such that the bottom end of the pushrod 50 extends from a bottom side or face of the retention seat 55. For assembly, the bottom end of the pushrod 50 may be slid into (and optionally through) the opening 57 of the retention seat 55.

As noted above, the second or lower end of the spring 54 may interface with the retention seat 55. According to one or more embodiments, the lower end of the spring 54 may be in direct contact or directly abut the retention seat 55.

Optionally, a maximum outer diameter of the retention seat 55 can be greater than the outer diameter of the spring 54. The retention seat 55 may retain in place the lower end of the spring 54. For instance, a recess 59, which can be annular and slightly larger in diameter than the outer diameter of the spring 54, can be provided on an upper side or face of the retention seat 55. This larger portion may be referred to or characterized as a flange. In some respects, the larger diameter portion (flange) of the retention seat 55 forming the recess 59 may be viewed or characterized as extending from the body of the retention seat 55 in the longitudinal direction. Thus, the larger diameter portion (flange) may be referred to or characterized as a retention seat extension.

The lower end of the spring 54 can be seated in the recess 59, for instance, to prevent or minimize radial movement of the spring 54. This seating may also prevent or minimize the spring 54 from contacting the pushrod 50 during operation. According to one or more embodiments of the disclosed subject matter, the upper face defining the bottom of the recess 59 may face (e.g., be parallel with) the face defining the bottom side of the clamp 33 and/or the face defining the bottom side of the spacer 52. Though being retained by the retention seat 55, such retention may be via mechanical force of the spring 54 itself, thus, the spring 54 may be characterized as being non-fixedly coupled to the retention seat 55, for instance, without either adhesive or fastener.

The spacer 52 can be annular or hollow with an opening 56. The opening 56 can be at a radial center of the spacer 52, extending entirely through the length of the spacer 52, from one end of the spacer 52 to the other end of the spacer 52. According to one or more embodiment, the spacer 52 may be referred to or characterized as a sleeve or a collar. Optionally, the body of the spacer 52 can be cylindrical. A length of the spacer 52 can be less than a length of the spring 54. The length of the spacer 52 may also be greater than a length of the retention seat 55. The spacer 52 can surround or circumscribe a portion of the pushrod 50 (second portion of pushrod 50). Thus, the pushrod 50 can extend through the opening 56 of the spacer 52. The spacer 52 may be made of a rigid material, such as metal (e.g., low carbon steel), as an example, which may be through hardened.

According to one or more embodiments, one or both ends of the spacer 52 may have flanges or the like that extend radially outward in one or more directions (e.g., all directions). Optionally, the ends of the spacer 52 may be differently configured. This may assist with proper assembly of the injector assembly 13, i.e., proper orientation of the spacer 52. For instance, as shown in FIG. 1 and FIG. 2, the spacer 52 can have a top flange 60 and a bottom flange 62 spaced in a longitudinal direction from the top flange 60. In some respects, the top flange 60 and/or the bottom flange 62 may be viewed or characterized as extending from the body of the spacer 52 in the longitudinal direction (opposite longitudinal directions in the case of both the top flange 60 and the bottom flange 62). Thus, the top flange 60 and/or the bottom flange 62 may be referred to or characterized as a spacer extension. Optionally, the bottom flange 62 may have a maximum outer diameter greater than a maximum outer diameter of the top flange 60.

A first or top end of the spacer 52 may interface with a bottom side or face of the clamp 33. Such interface may involve the top end of the spacer 52 directly contacting or abutting the bottom side of the clamp 33. According to one or more embodiments, the bottom side of the clamp 33 can have a recess 37. The recess 37 can be sized to receive and retain the top end of the spacer 52. As noted above, the top end of the spacer 52 may have the top flange 60 or the like extending radially outward. The recess 37 can be sized and shaped to mate with the geometrical configuration of the top end of the spacer 52, top flange 60 or otherwise. Here, the sidewall(s) of the clamp 33 forming the recess 37 can be adjacent to or abut the radial outer wall of the top end of the spacer 52 (e.g., formed by the top flange 60).

The interface between the top end of the spacer 52 and the bottom side of the clamp 33 can be via force of the spring 54 pressing against the spacer 52. Thus, the spacer 52 may be characterized as being non-fixedly coupled to the clamp 33, for instance, without either adhesive or fastener. The interface between the top end of the spacer 52 and the bottom side of the clamp 33, particularly the top end of the spacer 52 in the recess 37, can be such that radial movement of the spacer 52 is prevented during operation. This may prevent the spacer 52 from contacting the pushrod 50 during operation.

A second or bottom end of the spacer 52 may interface with a top end of the spring 54. Thus, the spacer 52 can be between the clamp 33 and the spring 54, as noted above. The bottom end of the spacer 52 may directly contact or abut the top end of the spring 54. The spring 54 may be characterized as being non-fixedly coupled to the spacer 52, for instance, without either adhesive or fastener. According to one or more embodiments, a maximum outer diameter of the spacer 52, for instance, at the bottom end thereof (e.g., with the bottom flange 62) may be greater than a maximum outer diameter of the spring 54.

The length of the spacer 52 can be set based on the configuration of the spring 54, for instance, the length of the spring 54 and/or the strength of the spring 54 (e.g., spring rate, stiffness, modulus, etc.) According to one or more embodiments, the length of the spacer 52 can be set to give sufficient preload for the spring 54, as well as to accommodate operating conditions. That is, the spacer 52 can be configured to set the assembled height and the operating height that defines the spring stiffness, for instance, of the spring 54, as assembled, and the operating length. The spacer 52 may also be sized to provide clearance to other engine components, such as the head casting.

Figure 3:
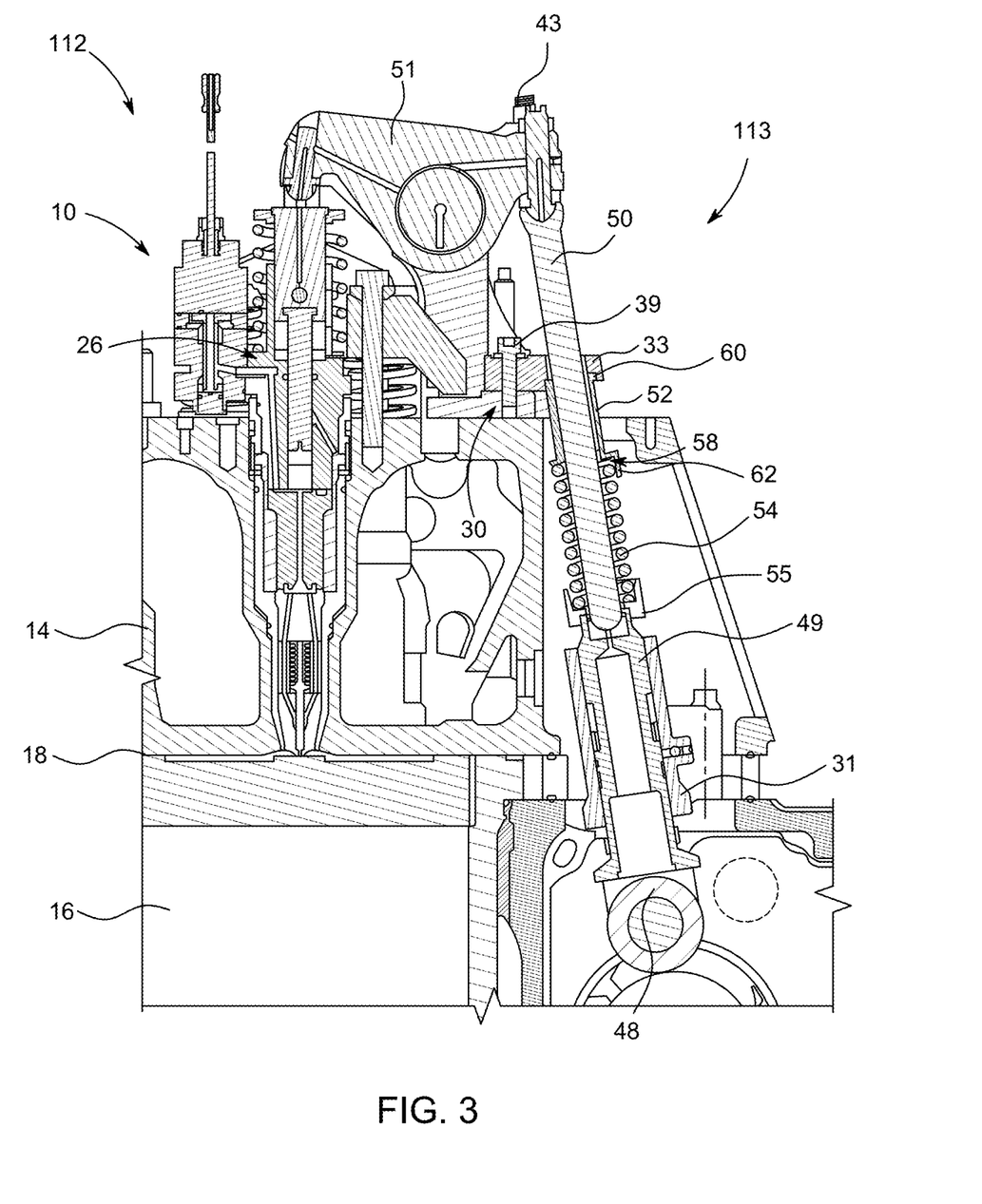
FIG. 3 is a sectional view of another injector assembly of an actuation system according to one or more embodiments of the disclosed subject matter.

Turning now to FIG. 3, FIG. 3 shows a side sectional view of another injector assembly 113 of an actuation system 112 according to one or more embodiments of the disclosed subject matter. Here, the above-discussed engine 10 is shown. The engine 10, which may be the same as the engine discussed above with respect to FIG. 1 and FIG. 2, may include an engine block 14 that at least partially defines one or more cylinders 16. A piston and a cylinder head 18 may be associated with each cylinder 16 to form a combustion chamber. Specifically, the piston may be slidably disposed within each cylinder 16 to reciprocate between a top-dead-center (MC) position and a bottom-dead-center (BDC) position, and cylinder head 18 may be positioned to cap off an end of cylinder 16, thereby forming the combustion chamber. Engine 10 may include any number of combustion chambers. The combustion chambers may be disposed in an "in-line" configuration, in a "V" configuration, in an opposing-piston configuration, or in any other suitable configuration.

Engine 10 may also include a crankshaft that is rotatably disposed within engine block 14. A connecting rod may connect each piston to the crankshaft so that a sliding motion of the piston between the TDC and BDC positions within each respective cylinder 16 results in a rotation of the crankshaft. Similarly, a rotation of the crankshaft may result in a sliding motion of the piston between the TDC and BDC positions. In a four-stroke engine, the piston may reciprocate between the TDC and BDC positions through an intake stroke, a compression stroke, a power stroke, and an exhaust stroke.

Cylinder head 18 may define one or more fluid passages (e.g., intake and exhaust passages) associated with each combustion chamber that are configured to direct gas (e.g., air and/or exhaust) or a mixture of gas and fluid (e.g., fuel) into or out of the associated chamber. The intake passage(s) may be configured to deliver compressed air and/or an air and fuel mixture into a top end of the combustion chamber. The exhaust passage(s) may be configured to direct exhaust and residual gases from the top end of the combustion chamber to the atmosphere. FIG. 3, for instance, shows a fuel injection assembly 26 to supply fuel into the cylinder 16.

Of course, the actuation system 112, like actuation system 12, may also include a plurality of gas exchange valves (e.g., intake valves and exhaust valves) positioned within the passages of cylinder head 18 to selectively engage corresponding seats that are pressed into (or otherwise formed inside of) cylinder head 18. Each of the gas exchange valves may be movable between a first position at which seat is engaged to inhibit a flow of fluid through the corresponding passage, and a second position at which seat is not engaged (i.e., at which the corresponding gas exchange valve is lifted) and thereby allows a flow of fluid through the passage. The timing at which the gas exchange valves are lifted, as well as a lift profile of the gas exchange valves, may have an effect on the operation of the engine 10. For example, the lift timing and profile may affect production of emissions, production of power, fuel consumption, efficiency, temperature, pressure, etc. At least one spring may be associated with each gas exchange valve and configured to bias the gas exchange valve toward the first position and against seat. A spring retainer (also known as a rotocoil) may connect spring(s) to a stem end of each gas exchange valve.

In some applications, actuation system 112 may further include an adjusting screw 43 located at the first end of rocker arm 51 (and rocker arms 38, 40). Adjusting screw 43 may be configured to connect rocker arm 51 with pushrod 50 (and pushrods 36) in an adjustable manner (e.g., manually).

Figure 4:
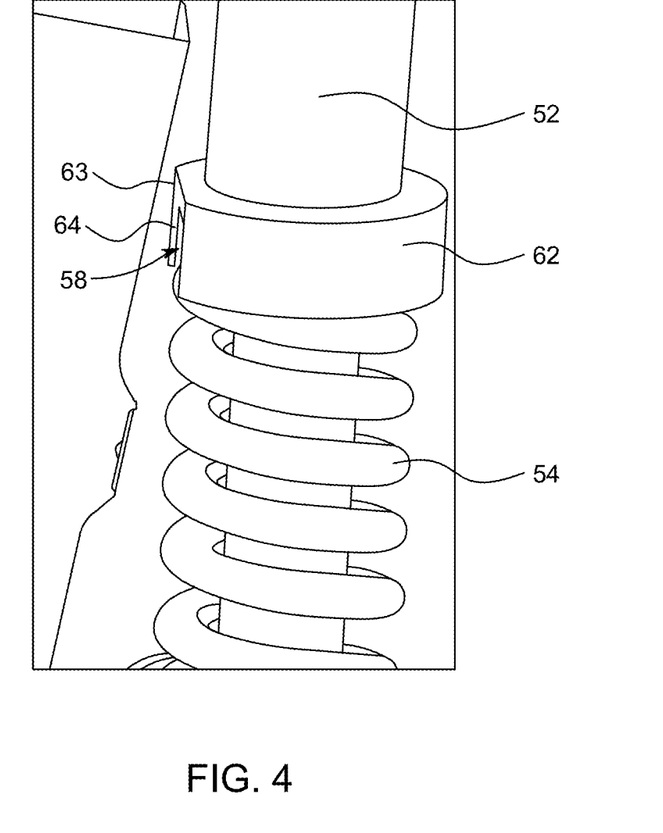
FIG. 4 is an enlarged view of a portion of a helper spring and a spacer of the injector assembly of FIG. 3.
Figure 5:
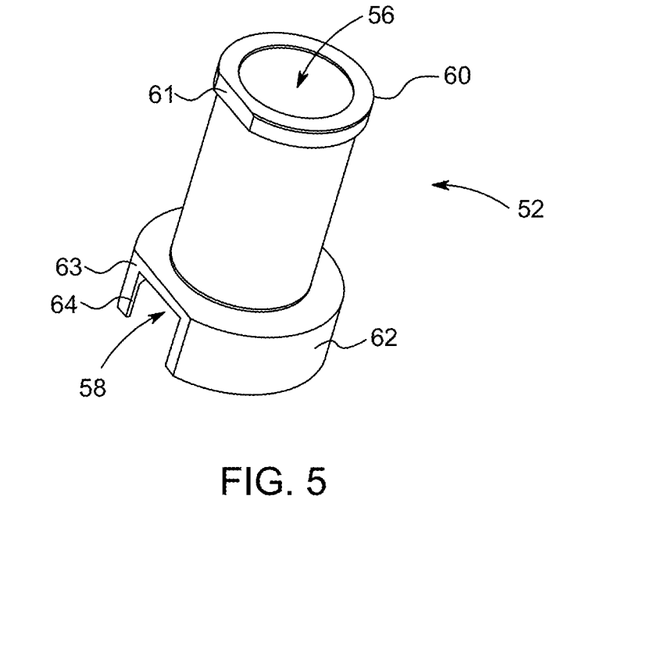
FIG. 5 shows the spacer of the injector assembly of FIG. 3 and FIG. 4.

Turning now to FIG. 4 and FIG. 5, as noted above, the spacer 52 can have a top flange 60 and a bottom flange 62. According to one or more embodiments, the bottom end of the spacer 52 may have a recess 58 within which to seat the top end of the spring 54. That is, the bottom flange 62 may form the recess 58, and the top end of the spring 54 can be inserted into and seated (including retained) in the recess 58. Such seating of the spring 54 in the recess 58 may prevent or minimize the spring 54 from contacting the pushrod 50 during operation.

Though the spacer 52 can be cylindrical or have a circular circumference in an end-view (including the body, the top flange 60, and the bottom flange 62 individually), according to one or more embodiments of the disclosed subject matter, one side of the spacer 52 may deviate from the cylindrical or circular circumference geometry. For instance, the top flange 60 may have a flat side 61 and/or the bottom flange 63 may have a flat side 63. As shown in FIG. 5, the flat side 61 and the flat side 63 can be on the same side of the spacer 52. A notch or cutout 64 may also be provided in the bottom flange 62, on the same side as the flat side 63.

The flat side 61, the flat side 63, and the notch 64, when installed or assembled as part of the injector assembly 13, 213, can face the upper support 30 and the cylinder head 18. The flat side 61, the flat side 63, and the notch 64 can maintain clearance for the spacer 52 from the upper support 30 and/or the cylinder head 18. The flat side 61, the flat side 63, and the notch 64 may provide a key so to speak for proper orientation of the spacer 52 during assembly. In this regard, the recess 37 of the clamp 33 may have a matching geometry with the upper end of the spacer 52 with the top flange 60 and the flat side 61 to ensure that the flat side 61 (and the flat side 63 and the notch 64) is properly oriented toward the upper surface 30 and the cylinder head 18 during installation.

INDUSTRIAL APPLICABILITY

As noted above, the present disclosure relates to fuel injectors, particularly mechanically actuated fuel injector systems, methods, and assemblies having a helper spring. Embodiments of the disclosed subject matter may be referred to or characterized as a helper spring system, method, and assembly for a mechanically actuated unit injector for an engine, for instance, a diesel engine, with a relatively high flow rate and/or relatively high injection pressure. As an example, the injectors may have ranges of steady-state flow rate of 6.8 to 10.0 lpm and/or injection pressure of up to 250 Mpa.

The helper spring system and assembly, according to embodiments of the disclosed subject matter, can be comprised of a spring, a spring seat, a spacer, and a hold-down clamp. The spring can act between a translating injector lifter and a rocker stand. The injector train can include a camshaft, a lifter, a pushrod, and a rocker arm. Systems, methods, and assemblies according to embodiments of the disclosed subject matter can provide increased stiffness to reduce or eliminate separation that may otherwise occur during an injection cycle. Implementing the spring between the mass of the injector train and the driving cam may also provide for the ability to maintain control over the actuation cycle. The injector train motion, therefore, can be governed by cam lobe profile with no or minimal separation of the injector train.

Otherwise, there may be a problem related to failure of mechanically actuated unit injectors. Generally, the components of injector train may separate due to high dynamic excitation. The separation of the injector drive train and subsequent reconnection can cause excessive loading and contact pressure between the mating components. This phenomenon may cause some or all of the following failure modes: camshaft spalling, increased mechanical fatigue (e.g., tappet spring fatigue), injector failure (e.g., injector tappet failure, injector spring failure, etc.), cam lobe failure, and/or accelerated wear of contact points. This may lead to the failure to meet emission and/or performance targets. Separation can also mean that motion is no longer being controlled, which can lead to overcompression of the injector and the potential for the injector to bottom out (hard stop), thereby transferring undesirable mechanical loading into the injector.

As noted above, embodiments of the disclosed subject matter can also provide for higher injection pressures and higher fuel delivery to satisfy the required emission and power density targets. Additionally, mechanical loading can be reduced, which can extend the lift of components in the injector drive train.

Embodiments of the disclosed subject matter can be customizable by altering characteristics of the spring and/or the spacer, such as spring length and/or spacer length. Injector assemblies according to embodiments of the disclosed subject matter may be such that the injector assembly need not be removed for injector and/or injector drive train servicing. Injector service may include setting the injector tappet height, replacing worn injectors, and conducting top end overhaul wherein the cylinder head is replaced. Thus, embodiments of the disclosed subject matter may also be retrofittable, for instance, in the field.

Figure 6:
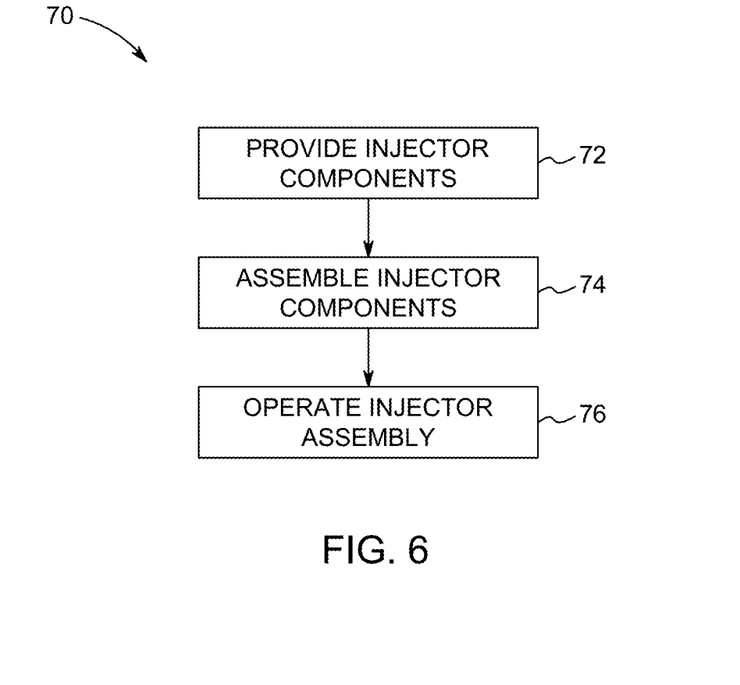
FIG. 6 is a flow chart of a method according to one or more embodiments of the disclosed subject matter.

FIG. 6 is a flow chart of a method 70 according to one or more embodiments of the disclosed subject matter.

The method 70 can include providing an injector assembly, such as injector assembly 13, 113 according to one or more embodiments of the disclosed subject matter. The injector assembly 13, 113 may be part of an actuation system, such as actuation system 12, 112.

Thus, at step or operation 72, the method 70 can including providing each of the individual components. The individual components can include in injector pushrod, such as pushrod 50; a clamp, such as clamp 33, having an opening sized to receive the pushrod 50; a spacer, such as spacer 52, which may be hollow and sized to receive therethrough the pushrod 50; a spring, such as spring 54, provided around the pushrod 50; and a retention seat, such as retention seat 55.

The method 70, at step or operation 72, can include assembling the injector assembly 13, 113. As noted above, assembly may be part of a retrofit and may be such that the injector assembly need not be removed for injector and/or injector drive train servicing.

Generally, the retention seat 55, the spring 54, and the spacer 52 can be between the clamp 33 and the lower support 31. And the spring 54 and the spacer 52 can be between the retention seat 55 and the clamp 31, with the spacer 52 between the spring 54 and the clamp 33. In that the clamp 33 can hold down the spacer 52 and the spring 54 against the retention seat 55, the clamp 33 may be referred to or characterized as a hold down clamp, as noted above. The pushrod 50 may extend through the clamp 33, the spacer 52, and the spring 54, in this order. The pushrod 50 may also at least extend into (and optionally through) the retention seat 55. The upper end of the pushrod 50 may be operatively connected to the injector arm 51, and the lower end of the pushrod 50 may be operatively connected to the injector lifter 49. According to one or more embodiments, the pushrod 50 may not extend through the upper support 30. The spring 54, which may be a coil spring, may function to maintain contact between injector follower 48 and the camshaft. Thus, the spring 54 may be referred to or characterized as a helper spring.

The method 70, at step or operation 74, can include operating the injector assembly 13, 113. This can involve the injector lifter 49, the pushrod 50, and the injector arm 51 moving in accordance with movement of the corresponding injector cam. In this regard, the pushrod 50, the spring 54, and the retention seat 55 can move with the movement of the injector lifter 49 (which can move based on movement of the corresponding cam). The spacer 52 and the clamp 33 may not move with the injector lifter 49. Here, the lower end of the spring 54 may move with the movement of the injector lifter 49, whereas the upper end of the spring 54 may not move with the movement of the injector lifter 49. As noted above, the injector assembly 13, 113 can prevent or minimize separation of the injector drive train.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A mechanically actuated fuel injector system comprising:
    an upper support;
    a set of arms supported by the upper support and individually rotatable around a shaft, the set of arms including an injector arm between a first rocker arm and a second rocker arm;
    a lower support spaced from the upper support;
    a set of pushrods respectively operatively coupled to the set of arms, the set of pushrods including an injector pushrod between a first valve pushrod and a second valve pushrod;
    a set of cam followers respectively operatively coupled to the set of pushrods, the set of cam followers including an injector cam follower between a first cam follower associated with the first valve pushrod and a second cam follower associated with the second valve pushrod;
    a hold down clamp extending from the upper support, the hold down clamp having an opening extending therethrough, the injector pushrod extending through the opening;
    a helper spring around the injector pushrod, between the hold down clamp and the lower support;
    a retention seat circumscribing the injector pushrod, a lower end of the helper spring being seated in the retention seat; and
    a spacer between the hold down clamp and the helper spring, an upper end of the helper spring abutting a lower end of the spacer, and an upper end of the spacer abutting a lower surface of the hold down clamp.

2. The mechanically actuated fuel injector system according to claim 1, wherein the first valve pushrod and the second valve pushrod are free of any springs.

3. The mechanically actuated fuel injector system according to claim 1, wherein the injector cam follower includes an injector lifter extending through the lower support, an upper portion of the injector lifter receiving a lower end of the injector pushrod, and the retention seat circumscribes the upper portion of the injector lifter.

4. The mechanically actuated fuel injector system according to claim 1, wherein a length of the helper spring is greater than a length of the spacer.

5. The mechanically actuated fuel injector system according to claim 1, wherein the hold down clamp is removably coupled to the upper support via one or more fasteners.

6. The mechanically actuated fuel injector system according to claim 1, wherein the upper end of the spacer is non-fixedly coupled to the lower surface of the hold down clamp, and the lower end of the spacer is non-fixedly coupled to the upper end of the helper spring during operation.

7. The mechanically actuated fuel injector system according to claim 1, wherein the injector pushrod extends from the injector arm to an injector lifter associated with the injector cam follower without extending through the upper support.

8. The mechanically actuated fuel injector system according to claim 1,
    wherein the injector pushrod, the helper spring, and the retention seat are movable with an injector lifter associated with the cam follower, and
    wherein the spacer and the hold down clamp are not movable with the injector lifter associated with the cam follower.

9. A method regarding an injector drivetrain assembly for a diesel engine, the method comprising:
    providing an injector pushrod of the injector drivetrain assembly;
    providing a clamp of the injector drivetrain assembly, the clamp having a first circular opening sized to slidably receive the injector pushrod;
    providing a coil spring, the coil spring being sized to surround a first portion of the injector pushrod;
    providing a spacer, the spacer being hollow and cylindrical, the spacer being sized to surround a second portion the injector pushrod different from the first portion, and the spacer being configured to directly contact the hold down clamp and a first end of the coil spring; and
    providing a retention seat to receive and retain a second end of the coil spring opposite the first end of the coil spring, the retention seat including a second circular opening extending therethrough to slidably receive the injector pushrod.

10. The method according to claim 9, wherein said providing includes assembling the injector drivetrain assembly such that the injector pushrod is slidably received through the first circular opening of the clamp, the injector pushrod is slidably received through the second circular opening of the retention seat, the first portion of the injector pushrod is surrounded by the coil spring, and the second portion of the injector pushrod is surrounded by the spacer, such that the spacer is between the clamp and the coil spring and the coil spring is between the retention seat and the spacer.

11. The method according to claim 10, wherein said assembling includes connecting the retention seat to an upper portion of an injector lifter.

12. The method according to claim 10, wherein said assembling includes:
coupling a first end of the injector pushrod to an injector arm, and
coupling a second end of the injector pushrod opposite the first end to an injector lifter.

13. The method according to claim 12, wherein said assembling is such that the injector pushrod extends from the injector arm to the injector lifter without extending through an upper support that supports the injector arm.

14. The method according to claim 10, further comprising operating the injector drivetrain assembly, said operating including the injector pushrod, the coil spring, and the retention seat moving with movement of an injector lifter, and the spacer and the clamp not moving with the movement of the injector lifter.

15. An injector drivetrain assembly comprising:
an injector pushrod;
a hold down clamp having an opening that slidably receives the injector pushrod;
a helper spring in the form of a coil spring that surrounds a first portion of the injector pushrod;
a hollow spacer in the form of a collar that surrounds a second portion of the injector pushrod and that is positioned to abut the hold down clamp and a first end of the helper spring; and
an annular retention seat that retains a second end of the helper spring opposite the first end of the helper spring and that surrounds a third portion of the injector pushrod.

16. The injector drivetrain assembly according to claim 15, wherein a length of the helper spring is greater than a length of the hollow spacer.

17. The injector drivetrain assembly according to claim 15,
wherein the hold down clamp is configured to be removably coupled to an upper support, which supports a set of arms including an injector arm, via one or more fasteners, and
the injector pushrod extends through the opening of the hold down clamp without extending through the upper support.

18. The injector drivetrain assembly according to claim 15, wherein a first face of the hold down clamp that abuts the hollow spacer directly faces a second face of the annular retention seat that abuts the helper spring.

19. The injector drivetrain assembly according to claim 15,
wherein a first end portion of the hollow spacer includes a first flange, the first end portion abutting the hold down clamp, and the first flange extending at least radially outward from a body of the hollow spacer,
wherein a second end portion of the hollow spacer opposite the first end portion includes a second flange, the second end portion abutting the first end of the helper spring, and the second flange extending at least radially outward from the body of the hollow spacer and being spaced in a longitudinal direction of the hollow spacer from the first flange,
wherein the first flange includes a first flat side and the second flange includes a second flat side on a same side of the hollow spacer as the first flat side, and
wherein the second flat side includes a cutout portion.

20. The injector drivetrain assembly according to claim 15, wherein a second end of the helper spring and the annular retention seat are movable relative to the hold down clamp and the hollow spacer during operation of the injector drivetrain assembly.

* * * * *